(12) United States Patent
Koyama (10) Patent No.: US 7,028,713 B2
(45) Date of Patent: Apr. 18, 2006

(54) SWITCHING VALVE

(75) Inventor: Katsumi Koyama, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 191 days.

(21) Appl. No.: 10/743,439

(22) Filed: Dec. 23, 2003

(65) Prior Publication Data

US 2004/0134548 A1 Jul. 15, 2004

(30) Foreign Application Priority Data

Jan. 6, 2003 (JP) ............................. 2003-000239
Jun. 6, 2003 (JP) ............................. 2003-161572

(51) Int. Cl.
*F16K 11/24* (2006.01)
(52) U.S. Cl. ...................................... 137/881; 137/883
(58) Field of Classification Search ................ 137/870, 137/881, 883, 538
See application file for complete search history.

(56) References Cited

U.S. PATENT DOCUMENTS 4,644,972 A * 2/1987 Perrott ........................ 137/883
4,699,176 A * 10/1987 Paddock ...................... 137/885

OTHER PUBLICATIONS

Patent Abstracts of Japan, Publication No. 2000-318436, dated Nov. 21, 2000. Discussed in the specification.
Patent Abstracts of Japan, Publication No. 2001-124440, dated May 11, 2001. Discussed in the specification.
Patent Abstracts of Japan, Publication No. 2002-211234, dated Jul. 31, 2002.

* cited by examiner

Primary Examiner—John Fox
(74) Attorney, Agent, or Firm—Westerman, Hattori, Daniels & Adrian, LLP (57) ABSTRACT

The object of the present invention is to provide a switching valve capable of increasing the opening stroke of a valve operated by a differential pressure while saving space, thereby reducing pressure loss. A first valve is disposed between an inlet port and a first outlet port. A pilot valve is provided between a back pressure chamber for a movable plug that holds a valve sheet disposed in a manner opposed to a valve seat, and the first outlet port, such that the first valve is operated by a solenoid. A second valve is arranged between the inlet port and a second outlet port. A back pressure chamber for a movable plug that holds a valve sheet disposed in a manner opposed to a valve seat and the first outlet port are communicated with each other. The second valve is opened by the differential pressure generated by closing of the first valve, and when the first valve is opened, the second valve is closed by the spring since the differential pressure is reduced to zero. After the second valve is closed, the valve-closed state thereof is maintained by the difference between pressure-receiving areas. The second valve is formed to have a sealing structure using a slidable X packing, whereby the valve-opening stroke can be increased.

4 Claims, 8 Drawing Sheets

SWITCHING VALVE

CROSS-REFERENCES TO RELATED APPLICATIONS, IF ANY

This application claims priority of Japanese Application No. 2003-000239 filed on Jan. 6, 2003, entitled "Switching Valve" and No. 2003-161572 filed on Jun. 6, 2003, entitled "Switching Valve".

BACKGROUND OF THE INVENTION (1) Field of the Invention

This invention relates to a switching valve, and more particularly to a switching valve for switching a refrigerant passage in a refrigeration cycle of an automotive air conditioner.

(2) Description of the Related Art

In general, in an automotive air conditioner, cooling is carried out using a refrigeration cycle that circulates refrigerant, and heating is carried out using engine coolant. Recently, however, due to the improvement in combustion efficiency of the engine, the temperature of the coolant does not rise high enough to a temperature required for heating. As a result, especially when the engine is started in winter, it takes a long time before the temperature in the compartment rises, and there can be cases in which even if the temperature rises, the temperature does not reach the setpoint.

To cope with the above inconvenience, it has been proposed to use high-temperature and high-pressure refrigerant discharged from the compressor in the refrigeration cycle for auxiliary heating (see e.g. Japanese Unexamined Patent Publication No. 2000-318436 (Paragraph No. [0016], FIG. 1)). More specifically, in the refrigeration cycle, high-temperature and high-pressure refrigerant adiabatically compressed by the compressor is first condensed by a condenser, and the condensed refrigerant is adiabatically expanded by an expansion valve into refrigerant at low temperature and low pressure. The expanded refrigerant is evaporated by an evaporator, and then separated into gas and liquid by an accumulator. Gaseous refrigerant obtained by the separation returns to the compressor. Although the evaporator carries out heat exchange between the low-temperature refrigerant and the air in the compartment, to thereby cool the air in the compartment, an attempt is being made to cause the high-temperature refrigerant discharged from the compressor to be introduced into the evaporator, to thereby utilize the evaporator as an air heater for auxiliary heating.

To this end, it is necessary to provide a switching valve on the discharge side of the compressor, for causing the compressed refrigerant to flow selectively toward the condenser or the evaporator. In a switching valve of this kind, a first solenoid valve is disposed between a compressor and a condenser, and a second solenoid valve is disposed between the compressor and an evaporator to thereby control the first and second solenoid valves such that the first solenoid valve is opened and the second solenoid valve is closed during cooling operation, and the first solenoid valve is closed and the second solenoid valve is opened during heating operation, whereby switching between the refrigerant passages is carried out.

As described above, two solenoid valves are required to switch between the refrigerant passages. However, a switching valve is also known which performs the switching operation with one solenoid valve (see e.g. Japanese Unexamined Patent Publication No. 2001-124440 (Paragraph Nos. [0018] to [0023], FIGS. 1 to 3)). According to this switching valve, a solenoid valve for performing opening/closing control of a refrigerant passage between a compressor and a condenser is integrally formed with a differential pressure valve that opens a refrigerant passage between the compressor and an evaporator when the differential pressure between the compressor and the condenser becomes equal to or larger than a predetermined value, with the above solenoid valve being in a closed state. The differential pressure valve comprises a valve element for sensing the differential pressure between the compressor and the condenser, a spring for urging the valve element toward a valve seat, and a diaphragm for sealing between the compressor and the condenser.

In the conventional switching valve of integral construction, however, the sealing mechanism of the differential pressure valve for opening and closing the refrigerant passage between the compressor and the evaporator is formed by the diaphragm which has small displacement stroke, and hence when an attempt is made to increase the opening stroke of the switching valve so as to reduce pressure loss in the differential pressure valve, the size of a valve construction is increased.

SUMMARY OF THE INVENTION

The present invention has been made in view of the above points, and an object thereof is to provide a switching valve in which the opening stroke of a valve operated by a differential pressure is increased while saving space, thereby reducing pressure loss.

To solve the above problem, the present invention provides a switching valve for causing refrigerant introduced into an inlet port to flow selectively to a first outlet port or a second outlet port, characterized by comprising a first valve that is disposed in a flow passage between the inlet port and the first outlet port, and controlled by a solenoid, for opening and closing the flow passage, and a second valve that includes a valve seat disposed between the inlet port and the second outlet port, a valve element capable of moving to and away from the valve seat, a passage for introducing pressure from the first outlet port to a surface of the valve element opposite to a surface of the valve element opposed to the valve seat, a spring for urging the valve element toward the valve seat, and a slidable sealing member disposed in a sliding portion of the valve element.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a longitudinal cross-sectional view showing the construction of the switching valve according to the first embodiment, with its solenoid being ON.

FIG. 4 is a longitudinal cross-sectional view showing the construction of the switching valve according to the second embodiment, with its solenoid being ON.

FIG. 6 is a longitudinal cross-sectional view showing the construction of the switching valve according to the third embodiment, with its solenoid being ON.

FIG. 8 is a longitudinal cross-sectional view showing the construction of the switching valve according to the fourth embodiment, with its solenoid being ON.

DESCRIPTION OF THE PREFERRED EMBODIMENTS

Hereinafter, embodiments of the present invention will be described in detail with reference to the drawings.

Figure 1:
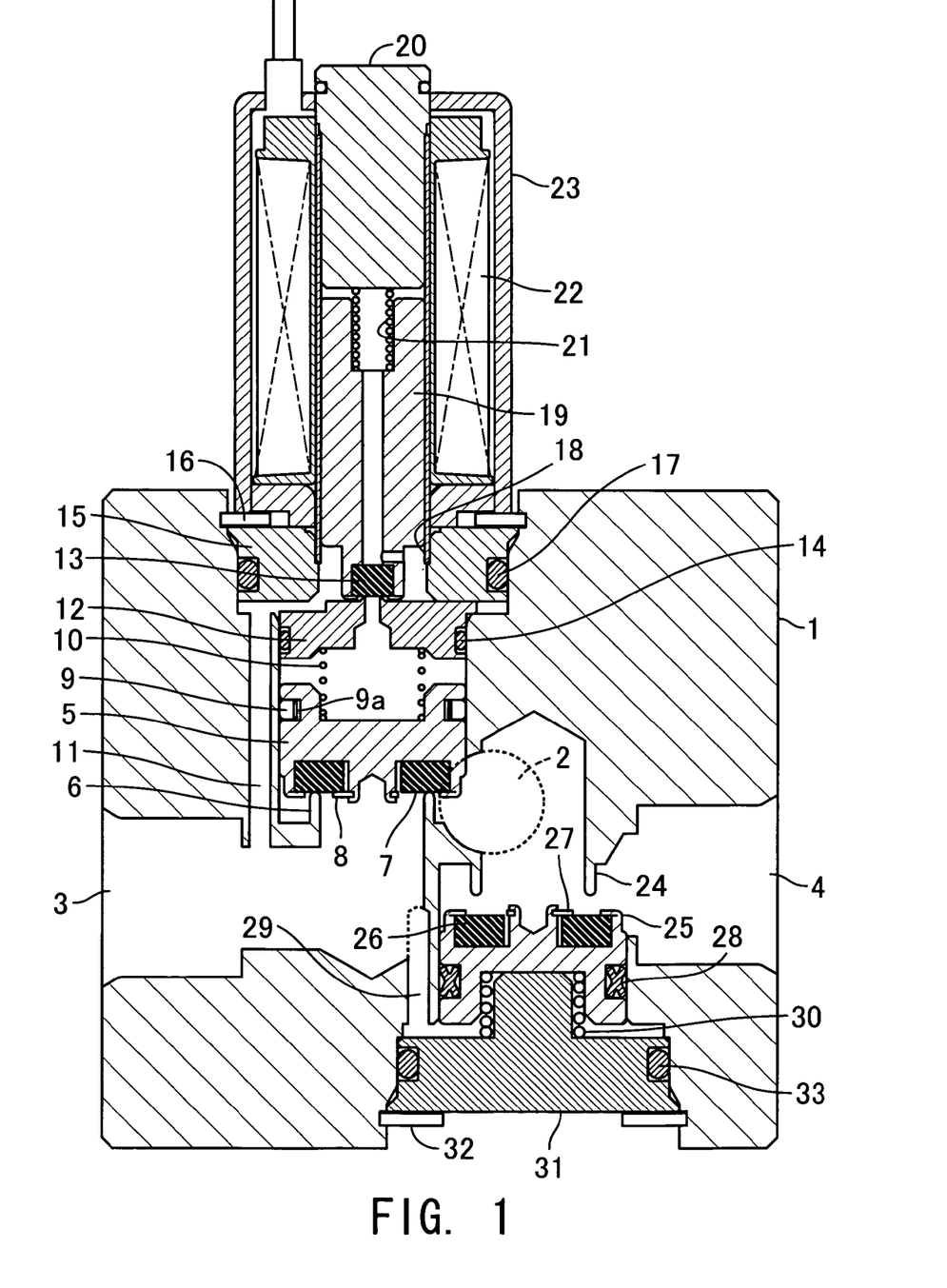
FIG. 1 is a longitudinal cross-sectional view showing the construction of a switching valve according to a first embodiment, with its solenoid being OFF.
Figure 2:
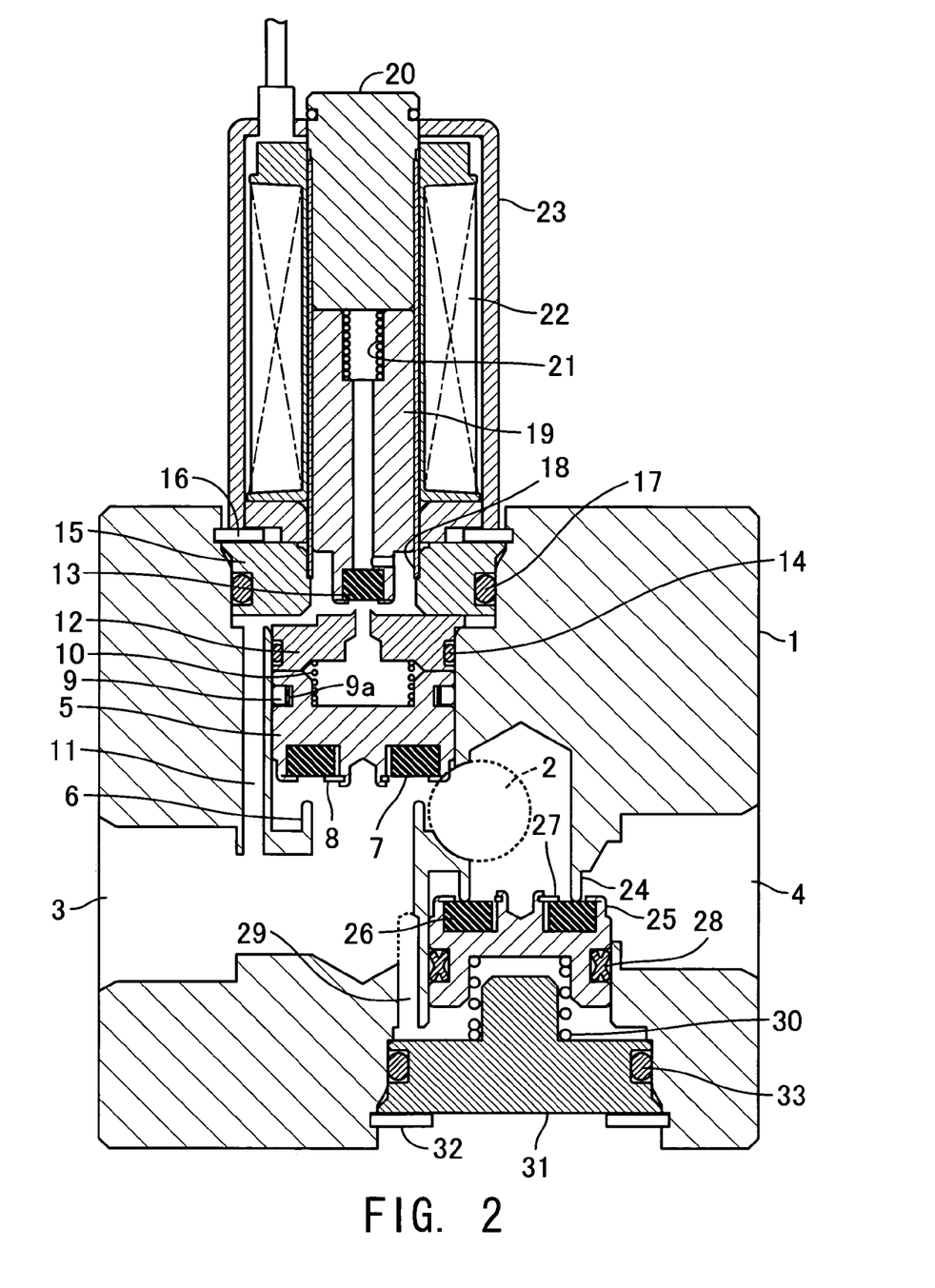

FIG. 1 is a longitudinal cross-sectional view showing the construction of a switching valve according to a first embodiment, with its solenoid being OFF. FIG. 2 is a longitudinal cross-sectional view showing the construction of the switching valve according to the first embodiment, with its solenoid being ON.

The switching valve includes the inlet port 2 formed in a side of a body 1, for introducing refrigerant fed under pressure from a compressor, and the first outlet port 3 and a second outlet port 4 for sending the introduced refrigerant selectively to a condenser or an evaporator, respectively. A cylinder bore communicating with the inlet port 2 has the movable plug 5 disposed therein in a vertically movable manner, as viewed in the figure. Below the movable plug 5, as viewed in the figure, there is provided a hollow cylindrical valve seat 6 integrally formed with the body 1 in a manner opposed to the movable plug 5. The valve seat 6 has a valve hole communicating with the first outlet port 3. The movable plug 5 has an annular valve sheet 7 disposed at a portion thereof via which the movable plug 5 is seated on the valve seat 6. The valve sheet 7 is held on the movable plug 5 by a washer 8 and a swaged portion of the movable plug 5. The valve sheet 7 is made of a flexible material so as to enhance sealing performance exhibited when the movable plug 5 is seated on the valve seat 6. Preferably, the valve sheet 7 can be formed by a sealing member made of polytetrafluoroethylene. Further, on the outer periphery of the movable plug 5, there are provided a piston ring 9 that slides on an inner wall of a cylinder bore accommodating the movable plug 5, and a tension ring 9a for radially outwardly urging the piston ring 9. A spring 10 is disposed in a back pressure chamber for the movable plug 5, for urging the movable plug 5 in a direction in which the movable plug 5 is seated on the valve seat 6.

A pilot valve is disposed above the cylinder bore accommodating the movable plug 5. The pilot valve comprises a valve portion for controlling whether or not the back pressure chamber for the movable plug 5 should be communicated with the first outlet port 3 via a passage 11 formed in the body 1, and a solenoid. The valve portion includes a fixed plug 12 which is configured to close the upper opening of the cylinder bore accommodating the movable plug 5 and has a valve hole in a center thereof, and a valve sheet 13 which is disposed in a manner movable to and away from a pilot valve seat formed by raising the rim of the upper opening of the valve hole, to thereby form a pilot valve element. The fixed plug 12 has an O ring 14 fitted on an outer periphery thereof, for sealing between the fixed plug 12 and the inner wall of the cylinder bore accommodating the fixed plug 12.

Above the fixed plug 12, there is provided a cap 15 disposed to close the upper opening of the body 1. The cap 15 is prevented from being removed from the body 1, by a C ring 16, and an O ring 17 seals between a space communicating with the passage 11 and the atmosphere. The solenoid for actuating the pilot valve comprises a sleeve 18 fitted in the central opening of the cap 15, a plunger 19 axially movably disposed in the sleeve 18 and holding the valve sheet 13 forming the pilot valve element at an end thereof, a core 20 provided for closing the upper end of the sleeve 18, a spring 21 disposed between the plunger 19 and the core 20, for urging the plunger 19 toward the fixed plug 12, a solenoid coil 22 circumferentially arranged outside the sleeve 18, and a yoke 23 disposed in a manner surrounding the solenoid coil 22. Thus, the above arrangement constructs a pilot-operated solenoid valve, that is, a first valve of the switching valve.

Further, a second valve of the switching valve disposed between the inlet port 2 and the second outlet port 4 has a hollow cylindrical valve seat 24 integrally formed with the body 1 in an intermediate portion of a passage communicating between the inlet port 2 and the second outlet port 4, and a movable plug 25 disposed movably from the side of the second outlet port 4 in a manner opposed to the valve seat 24. The valve seat 24 has a valve hole having substantially the same diameter as that of the valve seat 6 of the first valve. The movable plug 25 has an annular valve sheet 26 disposed at a portion thereof opposed to the valve seat 24. The valve sheet 26 is held on the movable plug 25 by a washer 27 and a swaged portion of the movable plug 25. Further, on the outer periphery of the movable plug 25, there is provided an X packing 28 made of a rubber or a resin, which seals between the movable plug 25 and the inner wall of a cylinder bore accommodating the movable plug 25 while sliding on the inner wall of the cylinder bore. By using the slidable X packing 28 as a sealing member, it is possible to set a large opening stroke of the second valve, to thereby reduce pressure loss occurring when the refrigerant passes through the second valve. The back pressure chamber for the movable plug 25 communicates with the first outlet port 3 via a passage 29, and has a spring 30 disposed therein for urging the movable plug 25 toward the valve seat 24. The cylinder bore accommodating the movable plug 25 has a lower opening thereof closed by a cap 31. The cap 31 is prevented from being removed from the body 1 by a C ring 32, and an O ring 33 seals between the back pressure chamber and the atmosphere.

In the switching valve constructed as above, when the solenoid coil 22 is in a deenergized state, i.e. when the solenoid is OFF, with no refrigerant being introduced into the inlet port 2, no solenoid force for actuating the pilot valve is generated, so that the plunger 19 is pushed downward as viewed in the figure by the spring 21, whereby the valve sheet 13 is seated on the pilot valve seat of the fixed plug 12. Since this causes the pilot valve to be in a closed state, the passage 11 leading from the back pressure chamber above the movable plug 5 to the first outlet port 3 is blocked. Further, the movable plug 25 is pushed upward by the spring 30, to thereby also block communication between the inlet port 2 and the second outlet port 4.

In the above state, when high-pressure refrigerant is introduced from the compressor into the inlet port 2, the pressure of the refrigerant attempts to push upward the movable plug 5 of the first valve, and to push downward the movable plug 25 of the second valve, to thereby act to open both of the first and second valves. However, in the first valve, part of the refrigerant introduced into the inlet port 2 enters the back pressure chamber for the movable plug 5 via the piston ring 9, so that the back pressure chamber for the movable plug 5 comes to have the same pressure as the pressure in the inlet port 2. As a result, as shown in FIG. 1, the movable plug 5 is urged toward the valve seat 6 by the spring 10 to thereby close the first valve. The closing of the first valve causes the movable plug 25 to receive high pressure on a side thereof toward the inlet port 2, and low pressure from the first outlet port 3 on a back pressure side thereof, so that the movable plug 25 is pushed downward by the differential pressure therebetween, whereby the second valve is placed in its valve-open state.

Next, when the solenoid coil 22 is energized, i.e. when the solenoid is ON, as shown in FIG. 2, the plunger 19 of the solenoid is pulled by the core 20, whereby the valve sheet 13 held on the plunger 19 is moved away from the valve seat formed on the fixed plug 12. This causes the back pressure chamber for the movable plug 5 to communicate with the first outlet port 3 via the passage 11, so that the pressure in the back pressure chamber is reduced, whereby the movable plug 5 is pushed upward by the pressure of the high-pressure refrigerant introduced into the inlet port 2. As a result, the valve sheet 7 held on the movable plug 5 is moved away from the valve seat 6 to thereby open the first valve. On the other hand, as for the second valve, the pressure in the back pressure chamber for the movable plug 25, which communicates with the first outlet port 3 via the passage 29, becomes equal to that at the inlet port 2 due to opening of the first valve. Since the movable plug 25 is urged toward the valve seat 24 by the spring 30, the valve sheet 26 held on the movable plug 25 is seated on the valve seat 24 to thereby close the second valve. When the valve sheet 26 is seated on the valve seat 24, the movable plug 25 has a pressure-receiving area on the side thereof toward the inlet port 2, which is equal to the cross-sectional area of the valve hole surrounded by the valve seat 24, and a pressure-receiving area on the back pressure side, which is equal to the cross-sectional area of the movable plug 25. This causes a force to act in the direction of closing of the second valve and the urging force of the spring 30 is also additionally applied, whereby the closed state of the second valve is maintained.

As described above, this switching valve is constructed to operate such that the second valve is opened by the differential pressure generated by closing of the first valve operated by the solenoid, and the differential pressure is reduced to zero by opening of the first valve, but the second valve is closed by the spring 30. After the second valve is closed, the valve-closed state is held by the spring 30 and the difference between the pressure-receiving areas. Further, both the first valve and the second valve holes have substantially the same diameter and the opening stroke thereof can be increased, so that it is possible to reduce pressure loss. Further, by using the slidable sealing member in the sealing structure of the second valve, it is possible to easily increase the opening stroke of the second valve moved by the above differential pressure, without increasing the size of the body 1. This makes it possible to form a switching valve having a space-saving structure.

Figure 3:
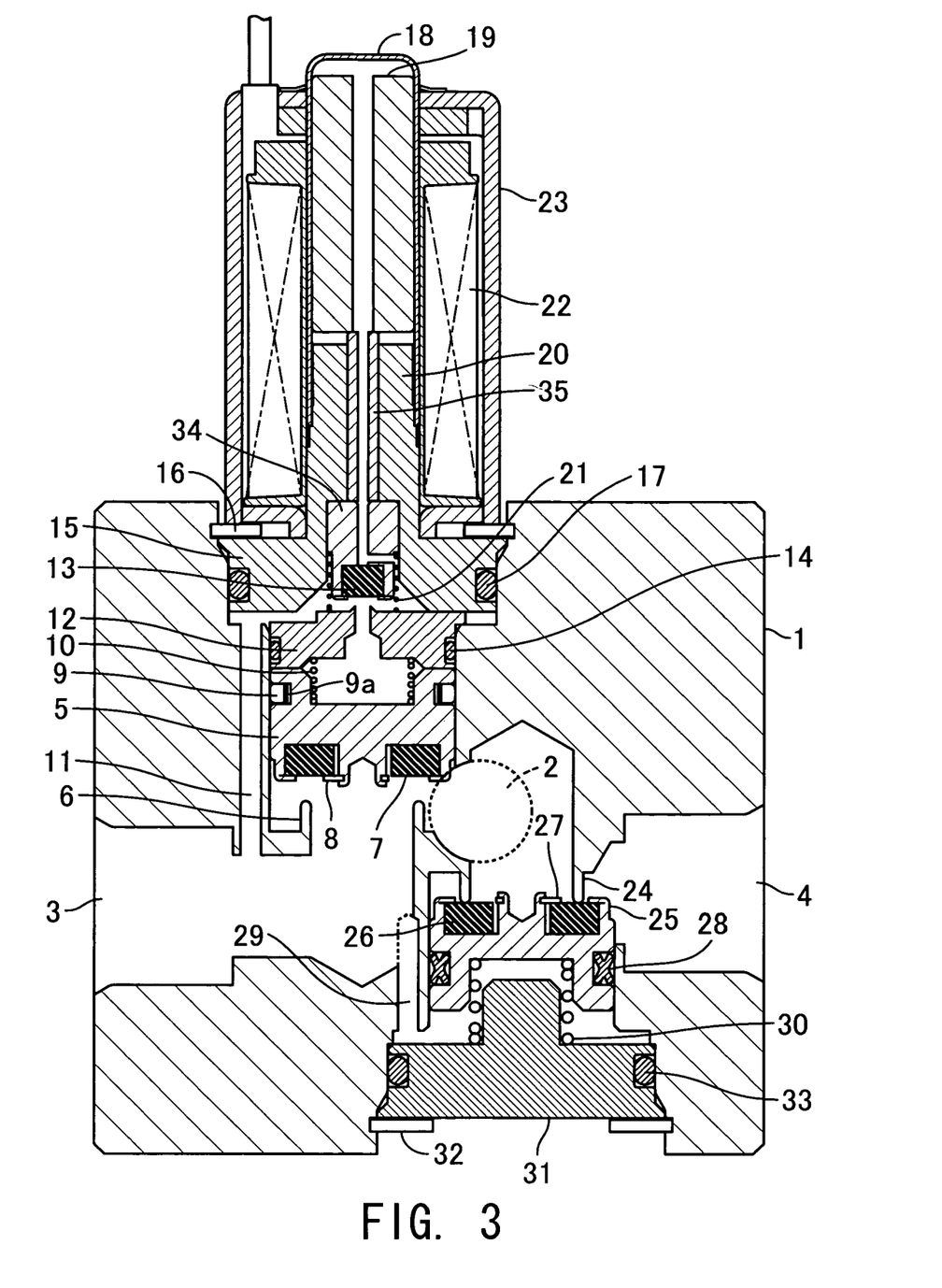
FIG. 3 is a longitudinal cross-sectional view showing the construction of a switching valve according to a second embodiment, with its solenoid being OFF.
Figure 4:
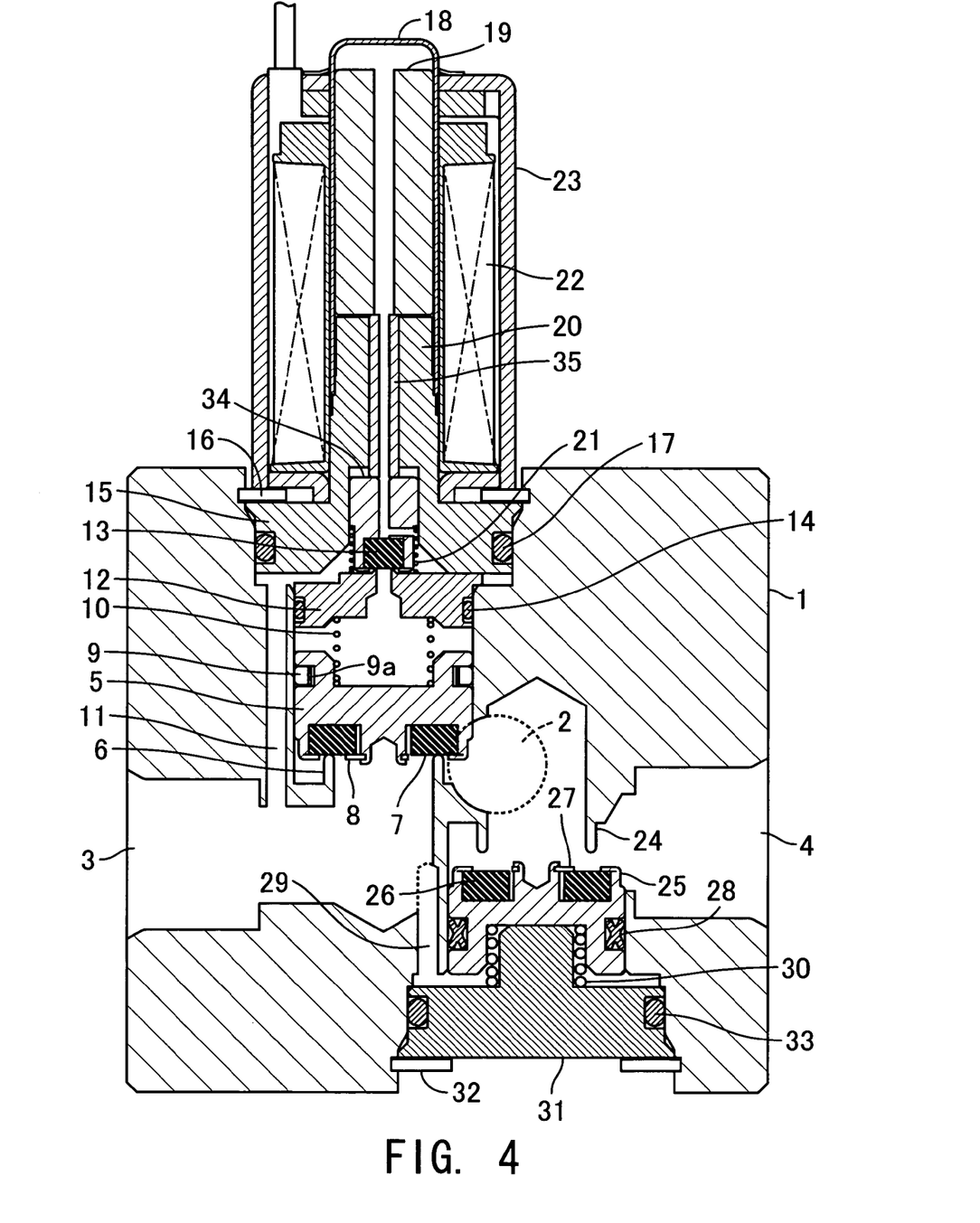

FIG. 3 is a longitudinal cross-sectional view showing the construction of a switching valve according to a second embodiment, with its solenoid being OFF. FIG. 4 is a longitudinal cross-sectional view showing the construction of the switching valve according to the second embodiment, with its solenoid being ON. In these figures, component elements having identical or equivalent functions to those of the component elements shown in FIG. 1 and FIG. 2 are designated by the same reference numerals, and detailed description thereof is omitted.

The switching valve according to the second embodiment is distinguished from the switching valve according to the first embodiment in which a first valve thereof is of a normally closed type which is closed when the solenoid is OFF, in that the first valve of the switching valve according to the second embodiment is of a normally open type.

The solenoid of the switching valve according to the second embodiment is constructed such that the core 20 is integrally formed with the cap 15 of the switching valve according to the first embodiment, with a flange portion thereof being disposed in a manner closing the upper opening of the body 1, and is rigidly fixed to the body 1 by the C ring 16. The solenoid has the plunger 19 thereof disposed within the sleeve 18 outside the core 20.

The core 20 has a cylinder bore which opens downward and a plug 34 is axially movably disposed therein. The plug 34 holds the valve sheet 13 at a lower portion thereof, and is urged in a direction in which it moves away from a valve seat formed on the fixed plug 12, by the spring 21 disposed between the plug 34 and the fixed plug 12. A shaft 35 extending through the core 20 is arranged between the plug 34 and the plunger 19. Due to this construction, when the solenoid is OFF, the urging force of the spring 21 is transmitted to the plunger 19 via the plug 34 and the shaft 35 to thereby move the plunger 19 away from the core 20. When the solenoid is turned ON, the solenoid force generated by pulling of the plunger 19 toward the core 20 is transmitted to the plug 34 via the shaft 35 to cause the valve sheet 13 held on the plug 34 to be seated on the valve seat formed on the fixed plug 12.

In the switching valve constructed as above, when high-pressure refrigerant is introduced into the inlet port 2 in a state of the solenoid being OFF, since the pilot valve is open to cause the back pressure chamber for the movable plug 5 to communicate with the first outlet port 3 at low pressure, the movable plug 5 is easily pushed upward by the pressure of the refrigerant, whereby the first valve is opened. At this time, the movable plug 25 is pushed downward by the pressure of the refrigerant and is about to open the second valve. However, due to opening of the first valve, pressure on a downstream side of the first valve is increased, and the increased pressure is introduced into the back pressure chamber for the movable plug 25 via the passage 29, so that the movable plug 25 causes the valve sheet 26 to be seated on a valve seat 24 by the upward urging force of the spring 30. After that, the second valve is held in its valve-closed state by the high pressure introduced into the back pressure chamber for the movable plug 25.

When the solenoid is turned ON, as shown in FIG. 4, the plunger 19 of the solenoid is pulled by the core 20, whereby the plunger 19 pushes downward the plug 34 via the shaft 35 to cause the valve sheet 13 held on the plug 34 to be seated on the valve seat formed on the fixed plug 12. Due to closing of the pilot valve, part of the refrigerant is introduced into the back pressure chamber for the movable plug 5 via the piston ring 9, so that the pressure in the back pressure chamber is about to have the same pressure as that in the inlet port 2. As a result, the movable plug 5 is pushed downward by the spring 10, whereby the valve sheet 7 is seated on the valve seat 6 to close the first valve. When the first valve is closed, the pressure in the first outlet port 3 is reduced, and the pressure in the back pressure chamber for the movable plug 25 is also reduced. Accordingly, the movable plug 25 is pushed downward by the high-pressure refrigerant, whereby the second valve is opened.

Figure 5:
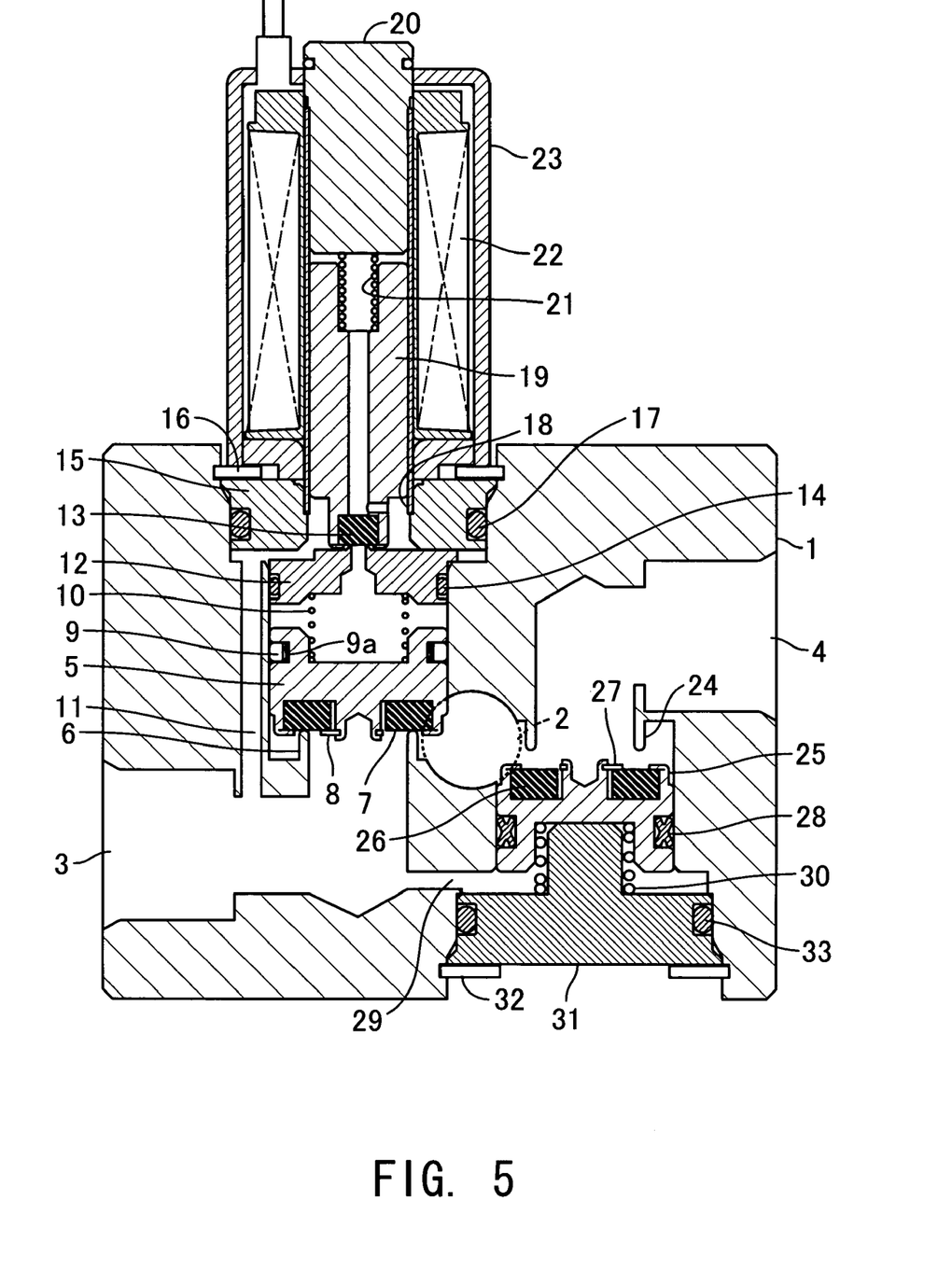
FIG. 5 is a longitudinal cross-sectional view showing the construction of a switching valve according to a third embodiment, with its solenoid being OFF.
Figure 6:
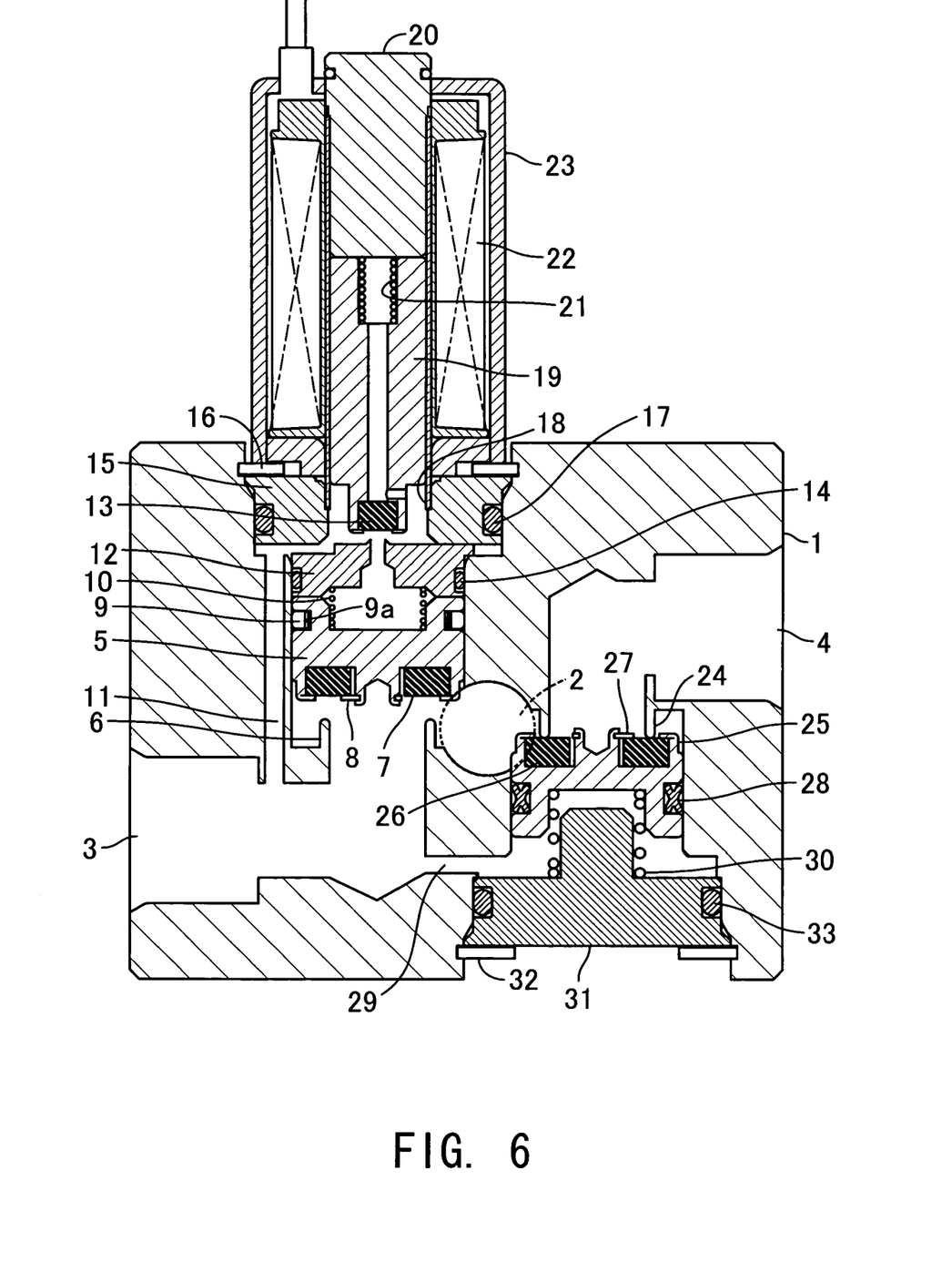

FIG. 5 is a longitudinal cross-sectional view showing the construction of a switching valve according to a third embodiment, with its solenoid being OFF. FIG. 6 is a longitudinal cross-sectional view showing the construction of the switching valve according to the third embodiment, with its solenoid being ON. In these figures, component elements having identical or equivalent function to those of the component elements shown in FIG. 1 and FIG. 2 are designated by the same reference numerals, and detailed description thereof is omitted.

The switching valve according to the third embodiment is distinguished from the switching valve according to the first embodiment in that a second valve thereof is disposed on the upstream side of the valve seat 24. In this embodiment, similarly to the movable plug 5 of the first valve, the movable plug 25 of the second valve is movably disposed in the cylinder bore communicating with the inlet port 2. Therefore, when the second valve is in its valve-closed state, the pressure-receiving area of the movable plug 25 where the pressure of refrigerant is received is equal to an area obtained by subtracting the cross-sectional area of the valve hole surrounded by the valve seat 24 from the cross-sectional area of the movable plug 25. Since the area is smaller than the pressure-receiving area of the movable plug 25 where the pressure of refrigerant is received from the back pressure chamber, the valve-closed state of the second valve can be maintained when the first valve is open and the second valve is closed.

In the switching valve constructed as above, when the solenoid is OFF, the pilot valve is in its valve-closed state. When high-pressure refrigerant is introduced into the inlet port 2, as shown in FIG. 5, first, in the first valve, the movable plug 5 is about to be moved upward by the pressure of the refrigerant introduced into the inlet port 2, but since part of the refrigerant enters the back pressure chamber for the movable plug 5 via the piston ring 9, whereby the pressure in the back pressure chamber for the movable plug 5 becomes equal to the pressure in the inlet port 2, so that the movable plug 5 is urged by the spring 10 toward the valve seat 6 to close the first valve. This causes the first outlet port 3 to be reduced in pressure, and hence the movable plug 25 is pushed downward by the pressure of the refrigerant introduced, whereby the second valve is opened.

When the solenoid is turned ON, as shown in FIG. 6, the pilot valve is opened to cause the back pressure chamber for the movable plug 5 to communicate with the first outlet port 3 via the passage 11, whereby the back pressure chamber for the movable plug 5 is reduced in pressure. This causes the movable plug 5 to be pushed upward by the pressure of the high-pressure refrigerant introduced into the inlet port 2 to open the first valve. When the first valve is opened, the pressure in the back pressure chamber for the movable plug 25, which communicates with the first outlet port 3 via the passage 29, becomes equal to the pressure in the inlet port 2, so that the movable plug 25 is pushed upward by the spring 30, to close the second valve.

Figure 7:
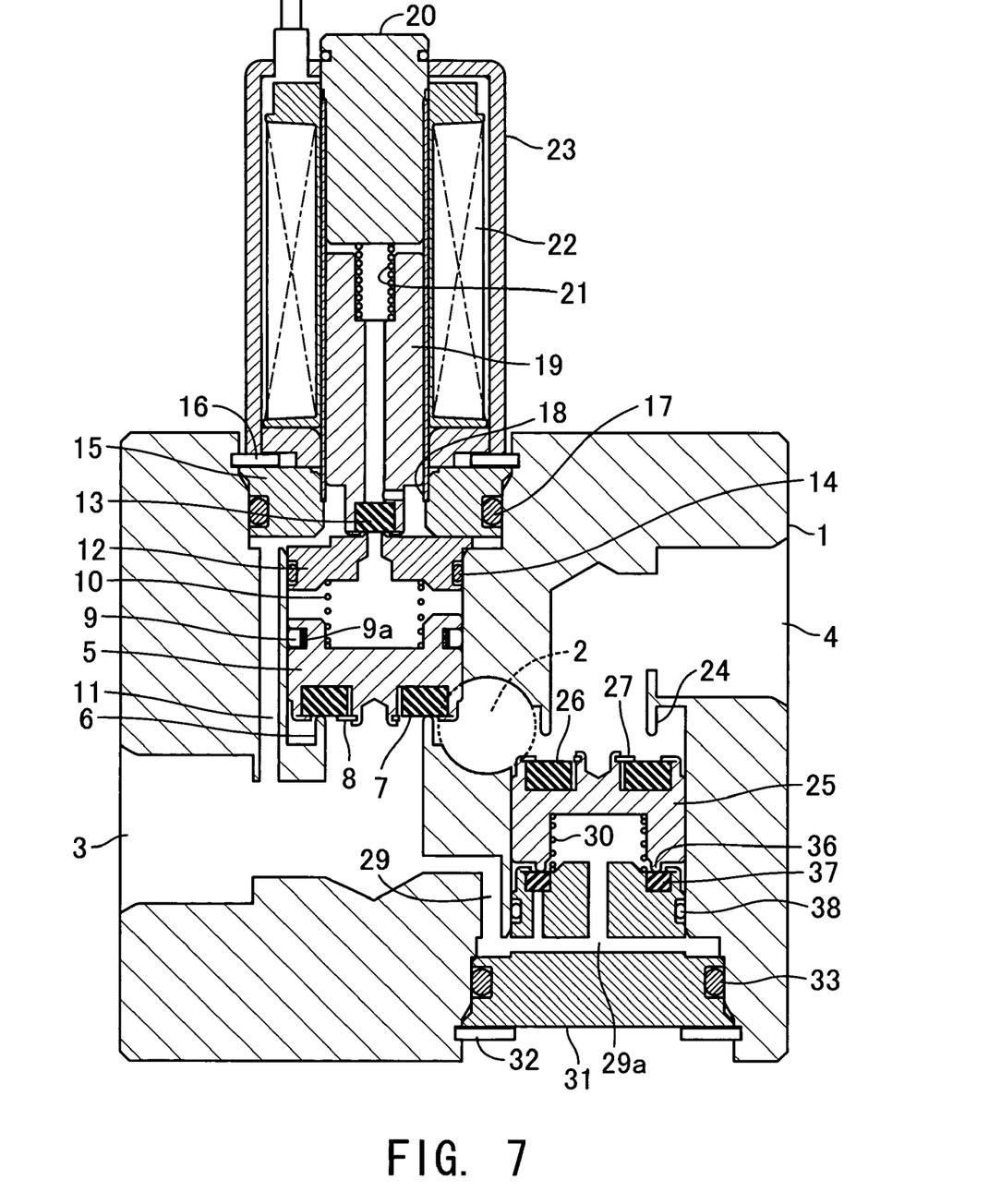
FIG. 7 is a longitudinal cross-sectional view showing the construction of a switching valve according to a fourth embodiment, with its solenoid being OFF.
Figure 8:
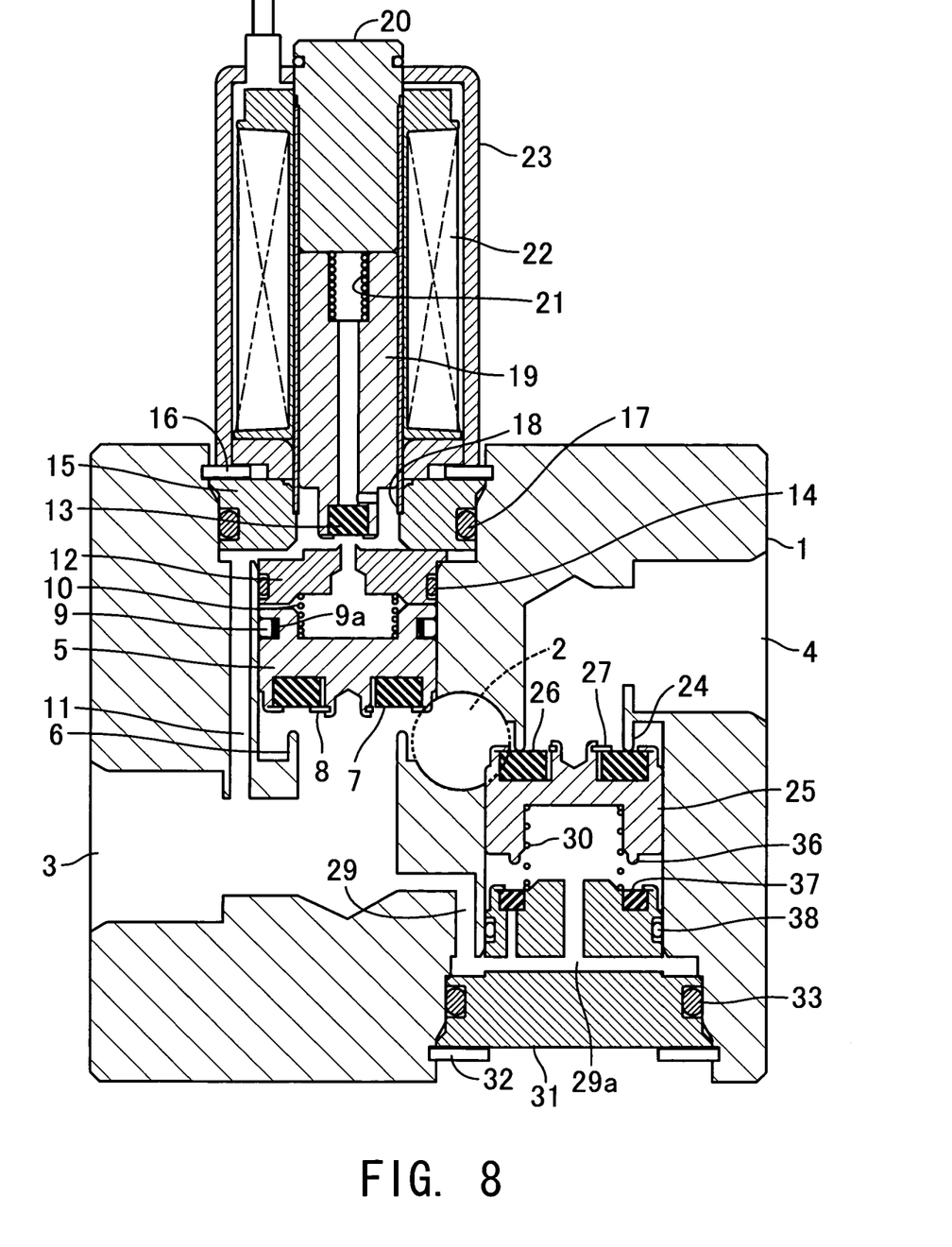

FIG. 7 is a longitudinal cross-sectional view showing the construction of a switching valve according to a fourth embodiment, with its solenoid being OFF. FIG. 8 is a longitudinal cross-sectional view showing the construction of the switching valve according to the fourth embodiment, with its solenoid being ON. In these figures, component elements having identical or equivalent capabilities to those of the component elements shown in FIGS. 5 and 6 are designated by the same reference numerals, and detailed description thereof is omitted.

The switching valve according to the fourth embodiment is distinguished from the switching valves according to the first to third embodiments in that the sealing structure of the second valve is changed from the X packing 28 having sliding resistance into a sealing structure having substantially no sliding resistance.

The second valve has a third valve disposed on the back pressure chamber side thereof, for isolating the sliding portion thereof and the back pressure chamber therefor from each other when the second valve is opened. More specifically, the movable plug 25 of the second valve has a lower end face thereof integrally formed with an annular projection 36 forming a valve element. On an end face of the cap 31 opposed to the annular projection 36 is arranged an annular valve sheet 37 forming a valve seat such that it forms a third valve together with the annular projection 36. The cap 31 has the passage 29a formed through a central portion thereof surrounded by the valve sheet 37, and opening into the back pressure chamber of the second valve. The passage 29a is formed such that it extends through the cap 31 to communicate with the passage 29 formed in the body 1. Further, the cap 31 has an O ring 38 fitted on an outer periphery thereof on a side toward the second valve, for preventing refrigerant from leaking into the passage 29 via the sliding portion of the movable plug 25 when the second valve is open and the third valve is closed.

Thus, the sealing of the sliding portion of the movable plug 25, which is required when the second valve is open, is made by using the annular projection 36 and the valve sheet 37. This makes it possible to dispense with the X packing 28 which is required for preventing internal leakage of refrigerant from the movable plug 25 of each of the switching valves according to the first to third embodiments, thereby making the movable plug 25 easy to move. Further, in the second valve according to the present embodiment, it is possible to reduce the spring force of the spring 30, which is required for urging the movable plug 25 in the valve-closing direction by overcoming the sliding resistance of the X packing 28. Furthermore, since the spring force of the spring 30 for urging the movable plug 25 in the valve-closing direction is reduced, a force attempting to close the second valve when it is open is reduced, which makes it possible to further reduce pressure loss of the refrigerant when the refrigerant passes through the second valve.

In the switching valve constructed as above, when the solenoid is OFF, the pilot valve is in its valve-closed state. When high-pressure refrigerant is introduced into the inlet port 2, as shown in FIG. 7, first, in the first valve, the movable plug 5 is about to be pushed upward by the pressure of the refrigerant introduced into the inlet port 2, but part of the refrigerant enters the back pressure chamber for the movable plug 5 via the piston ring 9, making the pressure in the back pressure chamber for the movable plug 5 equal to the pressure in the inlet port 2, which causes the movable plug 5 to be urged by the spring 10 toward the valve seat 6 to close the first valve. This causes the pressure in the first outlet port 3 to be reduced, and hence the movable plug 25 is pushed downward by the pressure of the refrigerant introduced, whereby the second valve is opened. At this time, the third valve, which comprises the annular projection 36 and the valve sheet 37 and is provided on the back pressure chamber side of the second valve, is closed, whereby it is possible to prevent the refrigerant from flowing from the inlet port 2 at high pressure to the first outlet port 3 at low pressure via the sliding portion of the movable plug 25 and the passage 29.

When the solenoid is turned ON, as shown in FIG. 8, the pilot valve is opened to cause the back pressure chamber for the movable plug 5 to communicate with the first outlet port 3 at low pressure via the passage 11. This causes the movable plug 5 to be pushed upward by the pressure of the high-pressure refrigerant introduced into the inlet port 2 to thereby open the first valve. When the first valve is opened, the pressure in the back pressure chamber for the movable plug 25, which communicates with the first outlet port 3 via the passages 29, 29a, becomes equal to the pressure in the inlet port 2, so that the movable plug 25 is pushed upward by the spring 30, to close the second valve.

Although in the first valve and the second valve in each of the above embodiments, the valve seats 7, 26 for enhancing sealing performance when the first and second valves are closed are arranged on the movable plugs 5, 25, respectively, they may be provided on the their valve seats.

Further, although in the first to third embodiments, the X packing is used as the slidable sealing member of the second valve, it is also possible to use an O ring.

Moreover, although it is only a matter of course that the present invention can be applied to a refrigerant passage-switching part which has one inlet port and is required to selectively switch between two outlet ports, in the refrigeration cycle disclosed e.g. in the aforementioned Japanese Unexamined Patent Publication No. 2000-318436 (Paragraph No. [0016], FIG. 1) or Japanese Unexamined Patent Publication No. 2002-211234, the present invention can be also applied to a refrigerant passage-switching part for bypassing one heat exchanger.

As described above, the switching valve according to the present invention is constructed to operate such that a second valve is opened by a differential pressure generated by closing of a first valve operated by a solenoid, and when the first valve is opened, the differential pressure is reduced to zero, but the second valve is closed by a spring, whereafter the valve-closed state is maintained by the spring and the difference between receiving areas. This makes it possible to increase the opening stroke while forming the first valve and the second valve such that they have valve holes having the same diameter, and thereby reduce pressure loss while saving space.

Further, by using a slidable seal in the second valve, more space can be saved than when a diaphragm-type differential pressure valve is used.

Alternatively, by providing a third valve for sealing a sliding portion of the second valve on a back pressure chamber side thereof, it is possible not only to save more space than when a diaphragm-type differential pressure valve is used but also to reduce the sliding resistance of the second valve, which makes it possible to further reduce the pressure loss in the second valve.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A switching valve for causing refrigerant introduced into an inlet port to flow selectively to a first outlet port or a second outlet port, characterized by comprising:
   a first valve that is disposed in a flow passage between said inlet port and said first outlet port, and controlled by a solenoid, for opening and closing said flow passage; and
   a second valve that includes a valve seat disposed between said inlet port and said second outlet port, a valve element capable of moving to and away from said valve seat, a passage for introducing pressure from said first outlet port to a surface of said valve element opposite to a surface of said valve element opposed to said valve seat, a spring for urging said valve element toward said valve seat, and a slidable sealing member disposed in a sliding portion of said valve element.

2. The switching valve according to claim 1, wherein said sealing member is an X packing.

3. A switching valve for causing refrigerant introduced into an inlet port to flow selectively to a first outlet port or a second outlet port, characterized in that:
   the switching valve comprises a solenoid-operated first valve that opens and closes a refrigerant passage between said inlet port and said first outlet port, and a second valve that is disposed in a refrigerant passage between said inlet port and said second outlet port, and is opened by a differential pressure generated by closing of said first valve, and
   that said second valve has a slidable sealing mechanism sealing between a downstream side of said first valve and a downstream side of said second valve.

4. A switching valve for causing refrigerant introduced into an inlet port to flow selectively to a first outlet port or a second outlet port, characterized in that:
   the switching valve comprises a solenoid-operated first valve that opens and closes a refrigerant passage between said inlet port and said first outlet port, and a second valve that is disposed in a refrigerant passage between said inlet port and said second outlet port, and is opened by a differential pressure generated by closing of said first valve, and
   that said second valve has a slidable sealing mechanism sealing between a downstream side of said first valve and a upstream side of said second valve.

* * * * *